United States Patent [19]

Hayes

[11] 4,416,503

[45] Nov. 22, 1983

[54] GRIPPING OR LOCATING DEVICES

[76] Inventor: Derek Hayes, Bungay, England

[21] Appl. No.: 282,585

[22] Filed: Jul. 13, 1981

[30] Foreign Application Priority Data

Jul. 14, 1980 [GB] United Kingdom ............... 8022922

[51] Int. Cl.³ ............................................. H01R 13/40
[52] U.S. Cl. ................................. 339/220 R; 174/135
[58] Field of Search .......... 339/220 R, 221 R, 221 M; 174/135

[56] References Cited

U.S. PATENT DOCUMENTS

| 2,765,450 | 10/1956 | Richardson | 339/220 R UX |
|---|---|---|---|
| 3,056,352 | 10/1962 | Sachs . | |
| 3,631,381 | 12/1971 | Pittman | 339/221 M X |
| 4,148,540 | 4/1979 | Hayes | 339/99 R |
| 4,171,856 | 10/1979 | Lynch | 339/221 M X |
| 4,274,700 | 6/1981 | Keglewitsch et al. | 339/221 M X |

FOREIGN PATENT DOCUMENTS

| 1272412 | 11/1967 | Fed. Rep. of Germany . | |
|---|---|---|---|
| 2027785 | 6/1970 | Fed. Rep. of Germany . | |
| 1399216 | 4/1965 | France | 339/220 R |
| 2402794 | 4/1979 | France . | |
| 18867 | of 1910 | United Kingdom . | |
| 613338 | 11/1948 | United Kingdom . | |
| 1559789 | 10/1975 | United Kingdom . | |
| WO80/01339 | 6/1980 | PCT Int'l. Appl. . | |

Primary Examiner—Howard N. Goldberg
Assistant Examiner—Timothy V. Eley
Attorney, Agent, or Firm—Howson and Howson

[57] ABSTRACT

A device for locating or gripping an elongated member, for example an insulated electrical conductor or cable, includes a pair of jaws having first and second opposed ends and made at least partly of resilient plastics material and a camming means into which the pair of jaws is insertable, with said first end first, for the purpose of engaging two opposite, outwardly-facing surfaces of the pair of jaws with a pair of opposed, inwardly-facing surfaces of the camming means so that the jaws are urged towards one another in order to locate or grip an elongated member between confronting faces of the two jaws. To enable the device to locate or grip elongated members having a wide range of cross-sectional areas, the jaws and/or the camming means are so shaped that, when the pair of jaws is fully inserted into the camming means with no elongate member between said confronting faces, the urging together of the jaws takes place by engagement between a limited area of one of said outwardly-facing surfaces of the pair of jaws and the adjacent inwardly-facing surface of the camming means, there being a gap between these two surfaces in a region extending from said second end of the pair of jaws towards said first end thereof.

10 Claims, 17 Drawing Figures

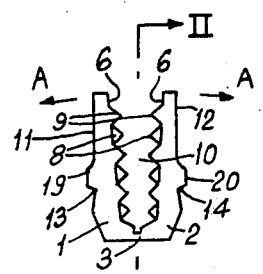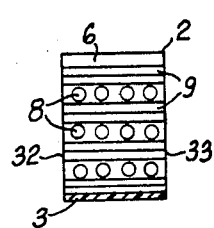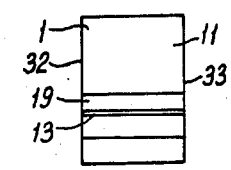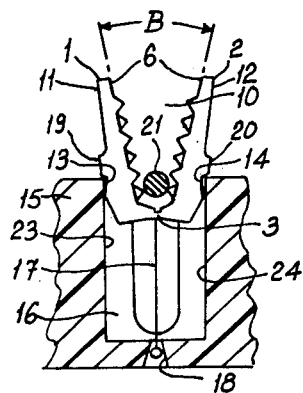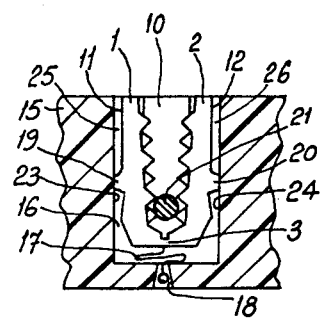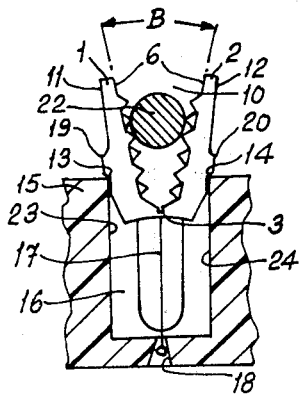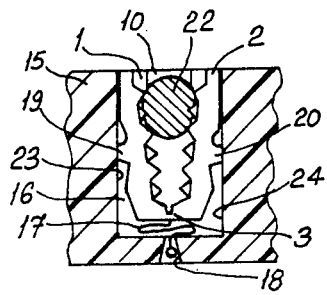

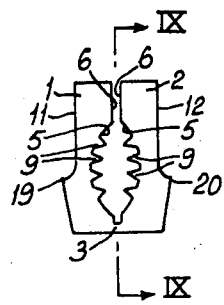
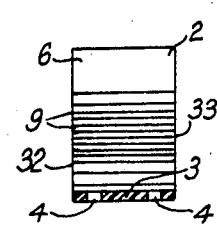
FIG. 8  FIG. 9
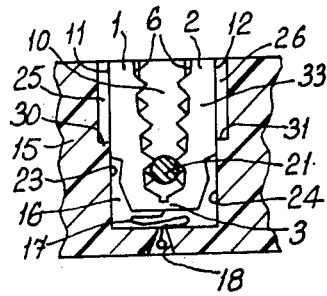
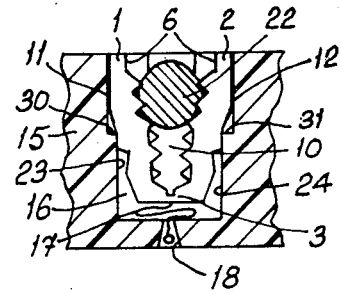
FIG. 10  FIG. 11
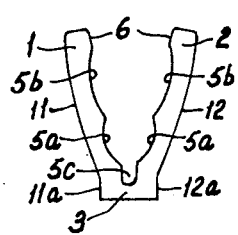
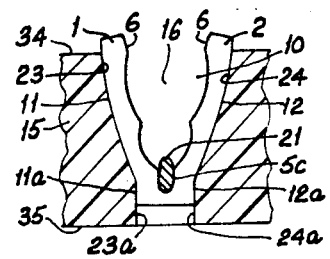
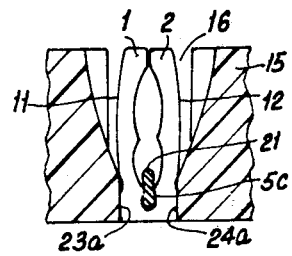
FIG. 12  FIG. 13  FIG. 14
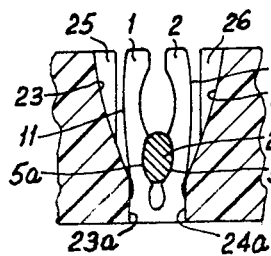
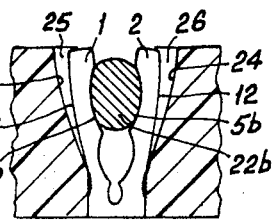
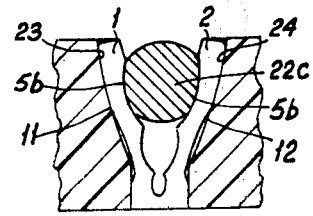
FIG. 15  FIG. 16  FIG. 17

GRIPPING OR LOCATING DEVICES

This invention relates to an improved gripping or locating device comprising a pair of jaws. In particular, but not exclusively, the invention relates to a device of this kind for gripping or locating an electrically insulated cable or conductor in an electrical coupling device.

In my British Pat. No. 1,559,789 (hereinafter referred to as "the aforesaid Specification") there are described various embodiments of electrical coupling devices each comprising a body portion having an electrically-insulating part with a recess in its surface, and electrically-conductive metallic piercing means mounted in said recess and extending generally in the direction of a pair of opposed sides of the recess but laterally spaced therefrom, and conductor-locating means comprising a pair of cooperating jaws movable relative to each other and having first mutually confronting surfaces configured to receive between them and locate an insulated electrical conductor when said jaws are urged toward one another, at least one end of said pair of jaws being configured to enter into said recess and to allow entry of said piercing means between the jaws and piercing of said conductor by said piercing means when said one end of the jaws is advanced into said recess, the outer surfaces of said pair of jaws and said opposed surfaces of said recess being configured to produce a camming action such that advancing said jaws into said recess urges the jaws towards one another to locate said conductor at least during piercing of the conductor by the piercing means.

In my International patent publication No. WO 80/01339 (hereinafter referred to as "the aforesaid Publication") there is described an electrical coupling device of the kind comprising means for effecting electrical connection to one or more conductors of an electrical cable which enters the device in use thereof and a support member provided with a cable grip for clamping the cable relative to the support member, which is characterized in that the cable grip comprises a pair of cooperating jaws adapted to receive the cable therebetween and camming means formed on the support member into which the pair of jaws with the cable therebetween can be pressed, said camming means being arranged to exert pressure on a pair of opposed surfaces of the pair of jaws to force the jaws towards one another to grip the cable when the jaws are pressed into the camming means in a direction substantially perpendicular to the path of the cable through the jaws, and said camming means comprising means to limit movement of the jaws in the direction of said path when a tensile force is applied to the gripped cable in a direction tending to pull the cable out of the coupling device.

In the coupling devices of both the aforesaid specification and the aforesaid publication there is a pair of cooperating jaws having for its purpose to locate or grip, respectively, an insulated electrical conductor or cable, respectively, and in use of the coupling devices the problem arises that the pair of jaws may be required to locate or grip a conductor or cable in a range of widely differing sizes, the problem being more pronounced in the case of the cable grip of the coupling device described in the aforesaid Publication.

Ways in which this problem can be overcome have been suggested in both the aforesaid specification and in the aforesaid publication. Thus, in the aforesaid specification and in the aforesaid publication it has been proposed to employ a pair of jaws provided with a plurality of conductor- or cable-receiving slots of different sizes, for example as illustrated in FIG. 6b of the aforesaid specification and FIG. 4 of the aforesaid publication. Again, in both the aforesaid specification and the aforesaid publication, it has been proposed to employ a pair of jaws provided with a conductor- or cable-receiving slot of oval cross-section, and in the aforesaid publication it has been proposed to provide packing pieces which can be inserted between the jaws of a pair to reduce the space available between the jaws for accommodating the cable.

The problem discussed above also arises in other situations where a pair of jaws is required to locate or grip one of a number of elongate members having a range of different cross-sectional areas, for example gripping one of a number of conduits of different sizes at an entrance to an electrical junction box.

The present invention aims to provide a combination of a pair of jaws and a camming means for urging the jaws together which at least largely eliminates the problem discussed above.

According to one aspect of the invention, the combination of a pair of jaws having first and second opposed ends and made at least partly of resilient plastics material and a camming means into which the pair of jaws is insertable, with said first end first, for the purpose of engaging two opposite, outwardly-facing surfaces of the pair of jaws with a pair of opposed inwardly-facing surfaces of the camming means so that the jaws are urged towards one another in order to locate or grip an elongate member between confronting faces of the two jaws, is characterised in that, when the pair of jaws is fully inserted into the camming means with no elongate member between said confronting faces, the urging together of the jaws takes place by engagement between a limited area of one of said outwardly-facing surfaces of the pair of jaws and the adjacent inwardly-facing surface of the camming means, there being a gap between these two surfaces in a region extending from said second end of the pair of jaws towards said first end thereof. Preferably, the urging together of the jaws, with no elongate member between said confronting faces, takes place by engagement between a respective limited area of each of said outwardly-facing surfaces of the pair of jaws and the respective adjacent inwardly-facing surface of the camming means, so that there is a respective gap between each of these pairs of adjacent surfaces in a region extending from said second end of the pair of jaws towards said first end thereof.

The or each of said gaps may be formed by suitable shaping of one or both of said outwardly-facing surfaces of the jaws and/or of one or both of the inwardly-facing surfaces of the camming means.

Preferably, the two jaws of the pair are joined together at said first end thereof, so that the two jaws hinge towards one another, about said first end, when the pair of jaws is inserted into the camming means.

The effect of the aforesaid gap or gaps in the combination in accordance with the invention is to increase the range of cross-sectional areas of elongate members which can be satisfactorily located or gripped by the pair of jaws in comparison with the combinations of pairs of jaws and camming means described in the aforesaid Specification or in the aforesaid Publication. The reason for this is that the resilient jaws can flex outwardly, at said second end of the pair of jaws, into said gap or gaps. In this outwardly flexed condition of the jaws, the jaws may or may not contact the opposed inwardly-facing surfaces of the camming means in said regions of the outwardly-facing surfaces of the jaws.

According to another aspect of the invention, an electrical coupling device comprising the combination of a pair of jaws having first and second opposed ends and made at least partly of resilient plastics material and a camming means into which the pair of jaws is insertable, with said first end first, for the purpose of engaging two opposite, outwardly-facing surfaces of the pair of jaws with a pair of opposed inwardly-facing surfaces of the camming means so that the jaws are urged towards one another in order to locate or grip an insulated electrical conductor or cable between confronting faces of the two jaws, is characterised in that, when the pair of jaws is fully inserted into the camming means with no conductor or cable between said confronting faces, the urging together of the jaws takes place by engagement between a limited area of one of said outwardly-facing surfaces of the pair of jaws and the adjacent inwardly-facing surface of the camming means, there being a gap between these two surfaces in a region extending from said second end of the pair of jaws towards said first end thereof. Preferably, the urging together of the jaws, with no conductor or cable between said confronting faces, takes place by engagement between a respective limited area of each of said outwardly-facing surfaces of the pair of jaws and the respective adjacent inwardly-facing surface of the camming means, so that there is a respective gap between each of these pairs of adjacent surfaces in a region extending from said second end of the pair of jaws towards said first end thereof.

In each of the above-recited aspects of the invention, the camming means may be a recess in a base member. This recess may take the form of a blind hole in a surface of the base member, this hole having two opposed surfaces which form the aforesaid inwardly-facing surfaces of the camming means. Alternatively, the recess may be formed between two spaced-apart pillars projecting from the base member, said opposed inwardly-facing surfaces of the camming means being provided by confronting surfaces of the two pillars.

Embodiments of the invention will now be described, by way of example, with reference to the accompanying drawings, in which FIG. 1 is an end view of a first pair of jaws forming part of a combination in accordance with the invention, FIG. 2 is a sectional view taken on the line II—II of FIG. 1, FIG. 3 is a side view of the pair of jaws of FIGS. 1 and 2, FIGS. 4 and 6 are sectional views of a first embodiment of a combination in accordance with the invention incorporating the pair of jaws of FIGS. 1 to 3, the jaws being shown in partially withdrawn position, FIGS. 5 and 7 are sectional views similar to FIGS. 4 and 6, respectively, but showing the jaws in fully inserted position, FIG. 8 is an end view of another pair of jaws forming part of a combination in accordance with the invention, FIG. 9 is a sectional view taken on the line IX—IX of FIG. 8, FIGS. 10 and 11 are views similar to FIGS. 5 and 7 of another embodiment of a combination in accordance with the invention, FIG. 12 is an end view of a further pair of jaws forming part of a combination in accordance with the invention, and FIGS. 13 to 17 are sectional views of a further embodiment of a combination in accordance with the invention employing the pair of jaws of FIG. 12.

Referring to FIGS. 1 to 3, the pair of jaws shown consists of jaws 1, 2, made of resilient plastics material, joined together at a first end by a hinge 3 in the form of a strip of plastics material moulded integrally with the two jaws. The hinge 3 is arranged to bias the two jaws apart at their second end, remote from the hinge 3, as indicated by the arrows A.

The jaw surfaces 6 which confront one another when the jaws are close together, as shown in FIG. 1, define a tapered gap 10 between the jaws, which gap is of increasing width in the direction away from the hinge 3. Each of the surfaces 6 is provided with ridges 9, disposed substantially parallel to the hinging axis of the hinge 3, and rows of pimples 8, all moulded on the surfaces 6, the ridges and pimples alternating as shown in FIG. 2. In each of the outwardly-facing surfaces 11, 12 of the jaws 1, 2 there is a respective notch 13, 14. The surfaces 11, 12 are shaped so that they have a respective projection 19, 20 intermediate their upper and lower ends which, in the embodiment shown, extend across the full width of the surfaces 11, 12 (see FIG. 3).

The pair of jaws 1, 2 is combined with a camming means to provide a combination in accordance with the invention. FIGS. 4 to 7 illustrate such a combination, in which the jaws 1, 2 of FIGS. 1 to 3 serve as a cable grip in a block 15 of electrically-insulating material forming part of an electrical coupling device of the kind described in the aforesaid publication. The jaws 1, 2 are shown held captive in the camming means in the form of a recess 16 in the block 15 by means of a cord or tape 17 secured at one end to the hinge 3 and at the other end in a hole 18 in the block 15. The cord or tape 17 may be moulded integrally with the hinge 3.

FIGS. 4 and 6 show the two jaws partially withdrawn from the recess 16 to the extent allowed by the cord or tape 17, and in this position the notches 13, 14 engage the upper edges of the recess 16 under the influence of the resilience of the hinge 3. Each time the jaws 1, 2 are moved into this partially withdrawn position, the surfaces 6 of the two jaws will be inclined to one another at the same predetermined angle B.

With the jaws occupying the partially withdrawn position shown in FIG. 4 or 6, an electrically insulated cable, which it is required to grip by means of the jaws 1, 2, is laid in the tapered gap, where it will rest in a position determined by its size. For example, a cable of small size might occupy the position indicated by the numeral 21 (FIG. 4), whereas a considerably larger cable might occupy the position indicated by the numeral 22 (FIG. 6). The two jaws are then pressed into the recess 16 to the position shown in FIG. 5 or 7, and the cable will be firmly gripped irrespective of its original resting position in the gap 10 (provided, of course, that in the original resting position the upper surface of the cable is below the upper ends of the jaws 1, 2). The longitudinally disposed ridges 9 on the surfaces 6 serve to resist any tendency for the cable to rise in the gap 10 as the jaws 1, 2 are pressed down into the recess 16.

From FIG. 5 it will be seen that the small size cable 21 is gripped by the jaws 1, 2 in a region quite close to the hinge 3. With such a cable, there is no appreciable distortion of the jaws 1, 2 as they are pressed into the recess 16 and urged together by engagement of the projections 19, 20 with the inwardly-facing surfaces 23, 24 of the recess. Consequently, then the jaws 1, 2 are fully inserted into the recess 16 there will be a gap 25 between the surfaces 11 and 23 and a gap 26 between the surfaces 12 and 24, these gaps extending from the upper ends of the jaws down to the projections 19, 20, respectively. When used with such a small size cable, the hinge 3 will be under tension and the pair of jaws acts on the cable in the same way as a nut-cracker.

From FIG. 7 it will be seen that the large size cable 22 is gripped by the jaws 1, 2 in a region well away from the hinge 3. With such a cable, the resilient jaws 1, 2 can deflect outwardly at their ends remote from the hinge 3 as the jaws are pressed into the recess 16 and urged together by engagement of the projections 19, 20 with the inwardly-facing surfaces 23, 24 of the recess. Consequently, the gaps 25, 26 described above with reference to FIG. 5 are to a large extent, or entirely, eliminated when the large size cable 22 is gripped by the jaws. Due to this ability of the jaws 1, 2 to deflect at their ends remote from the hinge 3, it will be appreciated that the jaws 1, 2 can securely grip cables in a wide range of sizes. When used with a large size cable, as shown in FIG. 7, the hinge 3 of the pair of jaws will be under compression.

Although the combination of FIGS. 4 to 7 has been described as being part of an electrical coupling device, it will be understood that the combination can be used in other devices, for example for gripping a conduit at the entrance to an electrical junction box, or by itself, for example as a stop member removably mountable on an elongate member or as a device, such as a cable cleat, for securing an elongate member to a support. In the last mentioned example, the camming means could be secured to a support by means of a nail, screw or the like.

A similar combination to that described above with reference to FIGS. 4 to 7 may be provided by using, instead of the pair of jaws 1, 2 shown in FIGS. 1 to 3, the pair of jaws shown in FIGS. 8 and 9 in combination with a camming means such as the recess 16 in the block 15 of FIGS. 4 to 7.

Referring to FIGS. 8 and 9, the pair of jaws shown again consists of jaws 1, 2 made of resilient plastics material, joined by a hinge 3 in the form of a strip of plastics material moulded integrally with the two jaws. Each of the jaws 1, 2 has an elongate member-receiving slot 5 formed in its surface 6, which slots are opposite one another when the two jaws are close together as shown in FIG. 8. In the embodiment of FIGS. 8 and 9, the two slots 5 define, when the surfaces 6 of the two jaws are close to one another, a hole of substantially oval cross-section.

Moulded into the surface of each of the slots 5 is a series of ridges 9 disposed substantially parallel to the longitudinal axes of the slots 5. The surfaces 11, 12 are shaped so that they have a respective projection 19, 20 intermediate their upper and lower ends which extend across the full width of the surfaces 11, 12. This shaping of the jaws enables them to deflect outwardly at their ends remote from the hinge 3 when the pair of jaws is used in the way described above with reference to FIGS. 5 and 7. Consequently, the jaws 1, 2 can securely grip or locate elongate members in a wide range of sizes.

FIGS. 10 and 11 illustrate a modified embodiment of the combination shown in FIGS. 4 to 7. In this embodiment, in which the same reference numerals are used to designate the same parts as in FIGS. 5 and 7, provision is made for outward deflection of the upper ends of the jaws 1, 2 not by shaping the outwardly-facing surfaces 11, 12 of the jaws, as in FIG. 5, but by suitable shaping of the inwardly-facing surfaces 23, 24 of the recess 16. Thus, in the combination shown in FIGS. 10 and 11, the recess 16 has steps 30 and 31 in its surfaces 23 and 24, respectively, to provide the gaps 25 and 26.

FIG. 12 illustrates a further pair of jaws 1, 2 for employment in a combination in accordance with the invention. The jaws 1, 2, which are made of resilient plastics material, are joined together by a hinge 3 in the form of a strip of plastics material moulded integrally with the two jaws. FIG. 12 shows the pair of jaws in its relaxed condition, as moulded.

The jaws 1, 2 have convexly curved, outwardly-facing surfaces 11, 12, respectively, extending for the major part of their height from the free ends of the jaws towards the hinge 3, but near to the hinge 3 the surfaces 11, 12 merge into plane surfaces 11a, 12a, respectively, which, in the relaxed condition of the jaws, are parallel to one another. The inwardly-facing surface 6 of each jaw is provided with two elongate member-receiving slots 5a, 5b of concave shape, the longitudinal axes of these slots being parallel to the hinging axis of the hinge 3. Near to the hinge 3, the surfaces 6 of the two jaws merge into a slot 5c having spaced-apart side walls which, in the relaxed condition of the jaws, are parallel to the plane surfaces 11a, 12a of the jaws.

The pair of jaws 1, 2 of FIG. 12 is combined with a camming means to provide a combination in accordance with the invention. FIGS. 13 to 17 illustrate such a combination, in which the jaws 1, 2 of FIG. 12 serve as a cable grip in a block 15 of electrically-insulating material forming part of an electrical coupling device of the kind described in the aforesaid publication. The block 15 has a recess 16 with concavely-curved, inwardly-facing surfaces 23, 24 which extend through the major part of the height of the block 15 from its upper surface 34 towards its lower surface 35. The two surfaces 23, 24 converge towards one another in the direction towards the lower surface 35 of the block 15, and close to the lower surface 35 the two surfaces 23, 24 merge into plane surfaces 23a, 24a, respectively, which are disposed parallel to one another and spaced apart a distance equal to the spacing apart of the plane surfaces 11a, 12a of the jaws of FIG. 12.

FIG. 13 shows the jaws 1, 2 of FIG. 12 partly inserted into the recess 16 of the block 15 with the jaws in relaxed condition with their convexly-curved, outwardly-facing surfaces 11, 12 in contact with the concavely-curved, inwardly-facing surfaces 23, 24, respectively, of the recess and the hinged end of the jaws entered a short way into the part of the recess 16 defined by the plane surfaces 23a, 24a. If, with the jaws in the position shown in FIG. 13, an insulated electric cable 21 of small cross-section, for example a twin lighting flex, is placed in the tapered gap 10 between the surfaces 6 of the two jaws 1, 2, the cable will drop down into the slot 5c. If the pair of jaws is then pressed down into the recess 16, the plane surfaces 11a, 12a of the jaws 1, 2 will be forced closer together as the curved surfaces 11, 12 of the jaws enter between the plane surfaces 23a, 24a of the recess to narrow the width of the slot 5c and firmly grip the cable 21 as shown in FIG. 14.

FIGS. 15 to 17 show how cables 22a, 22b and 22c of increasingly large cross-section are received between and gripped by the jaws. In FIG. 15 the cable 22a is gripped in the slots 5a, and in FIGS. 16 and 17 the cables 22b and 22c, respectively, are gripped in the slots 5b. In FIGS. 15 and 16 the cables 22a and 22b are of such a size that the jaws 1, 2 are spaced apart at their upper ends in a position in which there is a gap 25 between the surfaces 11 and 23 and a gap 26 between the surfaces 12 and 24. In these cases, the cables 22a and 22b are gripped solely by the camming action occurring between the surfaces 11, 12 of the jaws and the surfaces 23a, 24a of the recess. In FIG. 17 the cable 22c is of such a size that the surfaces 11, 12 of the jaws 1, 2 bear against the surfaces 23, 24, respectively, of the recess 16 at least along the parts of these latter surfaces lying closest to the surface 34 of the block 15. In this case, the cable 22a is gripped not only by the camming action occurring between the surfaces 11, 12 of the jaws and the surfaces 23a, 24a of the recess, but also by a further camming action between the surfaces 11, 12 of the jaws and the surfaces 23, 24 of the recess.

In the embodiment of FIGS. 13-17, the recess 16 extends right through the block 15. It is therefore a simple matter to remove the pair of jaws, either partially or wholly, from the recess 16 by exerting pressure on the hinged end of the pair of jaws.

If desired, the combination described above with reference to FIGS. 12 to 17 may be provided with means preventing complete withdrawal of the jaws 1, 2 from the recess 16. For example, projections may be provided on the surfaces 11a, 12a of the jaws which engage in grooves formed in the surfaces 23a, 24a of the recess, these grooves extending from the lower surface 35 of the block 15 part way up the surfaces 23a, 24a. These grooves may have such a length that the jaws can only be withdrawn from the recess 16 to the position shown in FIG. 13.

When the embodiments of the invention described above are used to grip cables of large cross-section, such as the cable 22c in FIG. 17, considerable force may be needed to press the jaws 1, 2 down into the recess 16. In the aforesaid Publication there is described a 3-pin electric plug having a base with a recess for the reception of a pair of jaws serving as a clamp for an insulated cable, the insulated conductors of which are connected to the pins of the plug. It is mentioned that, when the connections in the plug have been effected, the open top of the base is closed by a simple cover, which is designated by the numeral 6 in FIG. 2 of the aforesaid publication. Such a cover can be employed in the embodiments described above with reference to FIGS. 4-6, 8 and 9 and 13-17, and would be slidably mounted on the block 15, for example in the manner disclosed in British Pat. No. 833,222 (see FIG. 11 thereof). It is then a simple matter to provide the underside of such a cover with a groove having converging side walls which, as the cover is slid into its position of securement on the block 15, force the free ends of the jaws 1, 2 towards one another, and the bottom of this groove is inclined to the surface 34 of the block 15 so that, as the cover is moved to its position of securement, it bears against the free ends of the jaws 1, 2 and forces the pair of jaws down into the recess 16.

The invention is not, of course, limited to the various combinations described above with reference to the drawings. For example, in a combination employing the pair of jaws of FIGS. 8 and 9, the jaws 1, 2 may be provided with notches like the notches 13, 14 of the combination shown in FIGS. 4 to 7 for the purpose of setting the jaws in an open position for the reception of an elongate member. As an alternative to the notches 13, 14 of the combination shown in FIGS. 4 to 7, the surfaces 11, 12 of the jaws 1, 2 may be provided with recesses which extend only part way along the surfaces 11, 12. The upper edges of the walls 23, 24 of the recess 16 would then be provided with inwardly-directed projections to engage in these recesses in the partially withdrawn position of the pair of jaws.

Again, the confronting surfaces 6 of each of the pairs of jaws described above need not be parallel to one another (as viewed from above in each of FIGS. 1, 8, 10 and 12). For example, when viewed from above, the gap between the confronting surfaces 6, when the jaws 1, 2 are close together, may be wider at the end faces of the jaws (i.e. the faces 32, 33 indicated in FIGS. 2, 3, 9, 10 and 12) than in a region between the end faces, or wider in a region between the end faces of the jaws than at the end faces, or this gap may taper from one end face to the other. In the last mentioned case it is preferred that the narrowest portion of the gap should be at that end face of the jaws which is remote from the point of application of any possible tensile force to the elongate member located or gripped by the jaws.

Finally, although the embodiments of the invention described above are concerned mainly with the gripping of an insulated cable, they may also be employed for locating insulated conductors in an electrical coupling device of the kind described in the aforesaid Specification. It is then necessary to provide at least one hole in the hinge 3 of the pair of jaws 1, 2 for the passage of the conductor-piercing means which makes electrical contact with the located conductor. Such holes, designated by the numeral 4, are shown in FIG. 9.

What is claimed is:

1. In a device for gripping or locating an elongated member, which device comprises the combination of a pair of jaws made at least partly of resilient plastics material, said pair of jaws including resilient means joining respective first ends of the jaws, whereby respective second ends of the jaws are able to flex resiliently away from one another, each of said jaws further including an inwardly-facing surface and an outwardly-facing surface, the inwardly-facing surfaces of the two jaws confronting one another, and a camming means including a pair of spaced-apart inwardly-facing surfaces between which the pair of jaws is insertable, with said first ends of the jaws first, for the purpose of engaging said outwardly-facing surfaces of the pair of jaws with said inwardly-facing surfaces of said camming means so that the jaws are urged towards one another in order to grip or locate an elongated member disposed in said gap intermediate the first and second ends of the jaws and substantially parallel to said ends, the improvement wherein the confronting, inwardly-facing surfaces of the jaws define a gap which increases in width in the direction from the first ends of the jaws towards the second ends thereof, and said jaws and said camming means are shaped so that, when the pair of jaws is inserted into said camming means between said inwardly-facing surfaces thereof with no elongated member in said gap, there exists a gap between the outwardly-facing surface of one of the jaws and the adjacent inwardly-facing surface of the camming means in a region extending from the second end of said one jaw towards the first end thereof, whereby urging together of the jaws takes place by engagement of a limited area of the outwardly-facing surface of said one of the jaws and the adjacent inwardly-facing surface of the camming means.

2. A device according to claim 1, wherein said urging together of said jaws, with no elongated member in said gap, takes place by engagement between a respective limited area of each of said outwardly-facing surfaces of the pair of jaws and the respective adjacent inwardly-facing surface of the camming means, so that there is a respective gap between each of these pairs of adjacent surfaces in a region extending from said second ends of the pair of jaws towards said first ends thereof.

3. A device according to claim 1 or claim 2, wherein said camming means is formed by a recess in a base member.

4. A device according to claim 3, wherein said recess is in the form of a hole in the base member, said hole having two opposed surfaces which form said inwardly-facing surfaces of said camming means.

5. A device according to claim 3, wherein said recess is formed between two spaced-apart pillars projecting from said base member, said opposed, inwardly-facing surfaces of said camming means being provided by confronting surfaces of the two pillars.

6. In an electrical coupling device comprising the combination of a pair of jaws made at least partly of resilient plastics material, said pair of jaws including resilient means joining respective first ends of the jaws, whereby respective second ends of the jaws are able to flex resiliently away from one another, each of said jaws further including an inwardly-facing surface and an outwardly-facing surface, the inwardly-facing surfaces of the two jaws confronting one another and a camming means including a pair of spaced-apart inwardly-facing surfaces between which the pair of jaws is insertable, with said first ends of the jaws first, for the purpose of engaging said outwardly-facing surfaces of said pair of jaws with said inwardly-facing surfaces of said camming means so that the jaws are urged towards one another in order to grip or locate an insulated electrical conductor or cable disposed in said gap intermediate the first and second ends of the jaws and substantially parallel to said ends, the improvement wherein the confronting, inwardly-facing surfaces of the jaws define a gap which increases in width in the direction from the first ends of the jaws towards the second ends thereof, and said jaws and said camming means are shaped so that, when the pair of jaws is inserted into said camming means between said inwardly-facing surfaces thereof with no conductor or cable in said gap, there exists a gap between the outwardly-facing surface of one of the jaws and the adjacent inwardly-facing surface of the camming means in a region extending from the second end of said one jaw towards the first end thereof, whereby urging together of the jaws takes place by engagement of a limited area of the outwardly-facing surface of said one of the jaws and the adjacent inwardly-facing surface of the camming means.

7. An electrical coupling device according to claim 6, wherein said urging together of said jaws, with no conductor or cable in said gap, takes place by engagement between a respective limited area of each of said outwardly-facing surfaces of the pair of jaws and the respective adjacent inwardly-facing of the camming means, so that there is a respective gap between each of these pairs of adjacent surfaces in a region extending from said second ends of the pair of jaws towards said first ends thereof.

8. An electrical coupling device according to claim 6 or claim 7, wherein said camming means is formed by a recess in a base member.

9. An electrical coupling device according to claim 8, wherein said recess is in the form of a hole in the base member, said hole having two opposed surfaces which form said inwardly-facing surfaces of said camming means.

10. An electrical coupling device according to claim 8, wherein said recess is formed between two spaced-apart pillars projecting from said base member, said opposed, inwardly-facing surfaces of said camming means being provided by confronting surfaces of the two pillars.

* * * * *